United States Patent
Zhong et al.

(10) Patent No.: US 7,764,634 B2
(45) Date of Patent: Jul. 27, 2010

(54) SUPPRESSION OF ACOUSTIC FEEDBACK IN VOICE COMMUNICATIONS

(75) Inventors: Wei Zhong, Issaquah, WA (US); Chao He, Redmond, WA (US); Anton W. Krantz, Kirkland, WA (US); Qin Li, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1245 days.

(21) Appl. No.: 11/275,414

(22) Filed: Dec. 29, 2005

(65) Prior Publication Data

US 2007/0165880 A1 Jul. 19, 2007

(51) Int. Cl.
*H04B 3/20* (2006.01)

(52) U.S. Cl. .......................... 370/286; 327/3; 345/204; 375/376; 381/83; 381/86; 381/93; 381/101

(58) Field of Classification Search ................. 370/286; 341/22, 145; 375/360, 376; 704/230; 709/247; 327/3; 345/204; 381/83, 86, 93, 101
See application file for complete search history.

(56) References Cited

U.S. PATENT DOCUMENTS

| | | | |
|---|---|---|---|
| 4,088,835 A * | 5/1978 | Thurmond et al. ............ 381/83 |
| 4,675,885 A * | 6/1987 | Gagliardi et al. ............ 375/360 |
| 5,303,346 A * | 4/1994 | Fesseler et al. ............ 704/230 |
| RE35,574 E | 7/1997 | Russell et al. |
| 5,861,822 A * | 1/1999 | Park et al. .................... 341/22 |
| 5,910,994 A * | 6/1999 | Lane et al. .................... 381/93 |
| 6,097,820 A | 8/2000 | Turner |
| 6,198,419 B1 * | 3/2001 | Wen ........................... 341/145 |
| 6,496,581 B1 | 12/2002 | Finn et al. |
| 6,507,653 B1 | 1/2003 | Romesburg |
| 6,618,701 B2 | 9/2003 | Piket et al. |
| 6,718,036 B1 | 4/2004 | Van Schyndel et al. |
| 6,741,874 B1 | 5/2004 | Novorita et al. |
| 6,757,385 B1 | 6/2004 | Ehrenstråle et al. |
| 6,760,779 B1 * | 7/2004 | Riceman ...................... 709/247 |
| 6,771,701 B1 | 8/2004 | Klindworth et al. |
| 6,904,146 B2 | 6/2005 | Domer et al. |
| 6,928,161 B1 | 8/2005 | Graumann |
| 6,947,552 B2 | 9/2005 | Takada |
| 6,947,773 B2 * | 9/2005 | Novorita et al. ............. 455/570 |

(Continued)

OTHER PUBLICATIONS

"Telecommunication Network Technologies", from the Internet: http://www.ntt.oo.jp/RD/OFIS/active/1998pdfe/tn.pdf, pp. 4-15.

*Primary Examiner*—Gerald Gauthier
(74) *Attorney, Agent, or Firm*—Lee & Hayes, PLLC

(57) ABSTRACT

Suppressing one or more frequency ranges of a signal prevents the occurrence of feedback in a voice data communications application. A system recognizes a frequency range in a signal where feedback occurs, or anticipates a frequency range where feedback is anticipated. The signal includes a signal the input system generates or that the output system renders. The system suppresses the signal in the frequency range by disregarding one or more sampling bits representing the frequency range, or by applying one or more filters to attenuate or eliminate the signal in the frequency range. The system may monitor the signal to identify feedback resulting in different or additional frequency ranges and suppress the signal in the different or additional frequency ranges to prevent feedback from occurring.

17 Claims, 6 Drawing Sheets

U.S. PATENT DOCUMENTS

| | | | |
|---|---|---|---|
| 7,062,039 B1 * | 6/2006 | Rasmusson | 379/406.1 |
| 7,157,942 B2 * | 1/2007 | Meltzer | 327/3 |
| 7,203,324 B2 * | 4/2007 | Kreifeldt et al. | 381/93 |
| 7,349,514 B2 * | 3/2008 | Meltzer et al. | 375/376 |
| 7,447,321 B2 * | 11/2008 | Furge et al. | 381/86 |
| 7,602,925 B2 * | 10/2009 | Kreifeldt et al. | 381/93 |
| 2002/0159585 A1 | 10/2002 | Janse | |
| 2002/0172352 A1 * | 11/2002 | Mecayten | 379/406.01 |
| 2003/0133565 A1 | 7/2003 | Chang et al. | |
| 2004/0091099 A1 | 5/2004 | Akie | |
| 2004/0223575 A1 * | 11/2004 | Meltzer et al. | 375/376 |
| 2005/0063536 A1 | 3/2005 | Myllyla et al. | |
| 2005/0184976 A1 * | 8/2005 | Chiaki et al. | 345/204 |
| 2005/0213779 A1 * | 9/2005 | Coats | 381/101 |
| 2007/0165880 A1 * | 7/2007 | Zhong et al. | 381/93 |

* cited by examiner

FIGURE 1 (BACKGROUND)

SUPPRESSION OF ACOUSTIC FEEDBACK IN VOICE COMMUNICATIONS

BACKGROUND

People widely use Voice over Internet Protocol (VoIP) and other voice data communications applications for communicating their voices over computing networks. VoIP telephony service, for example, allows people in households and businesses that have broadband Internet access to make and receive full duplex calls without a telephone line, telephone service, or a long distance service.

VoIP software allows a user to make calls using a computer instead of using a telephone. If the computer is equipped with a microphone and one or more speakers, the user can use the computer as a hands-free speakerphone. VoIP software may permit full duplex operation so that a user can both speak and listen at the same time, just as when using an ordinary telephone.

In FIG. 1, a woman (not shown) using a desktop computer 100 equipped with speakers 110 and a microphone 120 uses the desktop computer 100 as a hands-free speakerphone.

The microphone 120 captures the woman's words, and software executing on the desktop computer 100 translates her speech into a first signal 160. A network (not shown) carries the first signal 160 to a portable computer 130 that a man (not shown) uses as a speakerphone. The woman's speech carried by the first signal 160 is rendered by integrated speakers 140 in the portable computer. An integrated microphone 150 of the portable computer 130 captures the man's speech, and the portable computer 130 translates his speech into a second signal 170. The network carries the second signal 170 to the desktop computer 100, where the man's speech is rendered by the speakers 110.

Because the VoIP service permits full duplex operation, such that people can listen and speak at the same time, users may encounter acoustic feedback. For example, after the man's speech is captured by the integrated microphone 150, transmitted as the second signal 170, and rendered by the speakers 110, the microphone 120 may re-capture his speech. The first signal 160 will carry his speech back to the portable computer 130 and cause his speech to be re-rendered by the integrated speakers 140. The integrated microphone 150 will again re-capture his speech and transmit it to the desktop computer 100. The continual re-capturing and re-rendering of his speech may cause energy to build in one or more frequency ranges, causing feedback.

To avoid feedback, VoIP users may reduce speaker volume. However, reducing the volume may make it difficult to hear another caller. Users also may reposition their speakers or microphones to attempt to prevent the microphones from re-capturing sounds rendered by the speakers, although this may not solve the problem. Further, a user of a portable computer 130 with integrated speakers 140 and an integrated microphone 150 cannot reposition such devices.

SUMMARY

Suppressing one or more frequency ranges of a signal prevents the occurrence of feedback in a voice data communications application. A system recognizes a frequency range in a signal where feedback occurs, or anticipates a frequency range where feedback is anticipated. The signal includes a signal the input system generates or that the output system renders. The system suppresses the signal in the frequency range by disregarding one or more sampling bits representing the frequency range, or by applying one or more filters to attenuate or eliminate the signal in the frequency range. The system may monitor the signal to identify feedback resulting in different or additional frequency ranges and suppress the signal in the different or additional frequency ranges to prevent feedback from occurring.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

Overview

The following document describes tools capable of reducing feedback by suppressing one or more frequency ranges in a signal when a system detects or anticipates acoustic feedback in one or more frequency ranges.

Feedback results when a signal is continually carried between an output system and an input system, and continuing re-amplification of the signal in a frequency range causes the strength of the signal to be multiplied. To reduce or eliminate the feedback, a system identifies or anticipates the frequency range or ranges in which the feedback occurs. The system suppresses the signal in the frequency range or ranges either before an output system renders output from the signal or captures input from the output system. Suppressing the frequency range or ranges where the feedback occurs or is likely to occur suppresses feedback.

An environment in which the tools may enable these and other techniques is set forth below in a section entitled Exemplary Operating Environment. This section is followed by another section describing processes for enabling these and other techniques, entitled Suppressing Signals in Frequency Ranges to Prevent Feedback.

Exemplary Operating Environment

Before describing the tools in detail, the following discussion of an exemplary operating environment is provided to assist the reader in understanding some ways in which various inventive aspects of the tools may be employed. The environment described below constitutes but one example and is not intended to limit application of the tools to any one particular operating environment. Other environments may be used without departing from the spirit and scope of the claimed subject matter.

Figure 1:
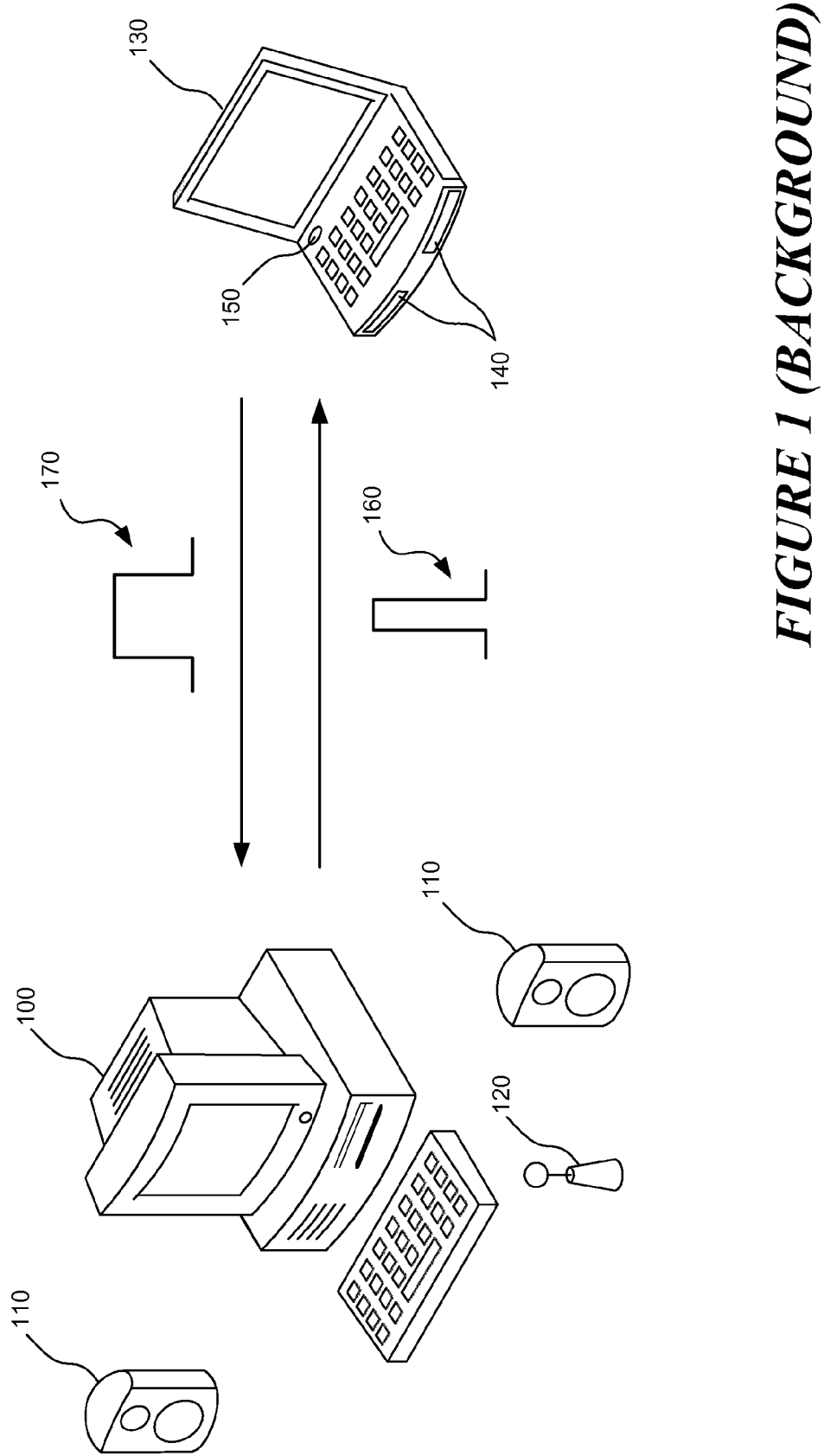
FIG. 1 (Background) illustrates two computing systems used in voice data communications.
Figure 2:
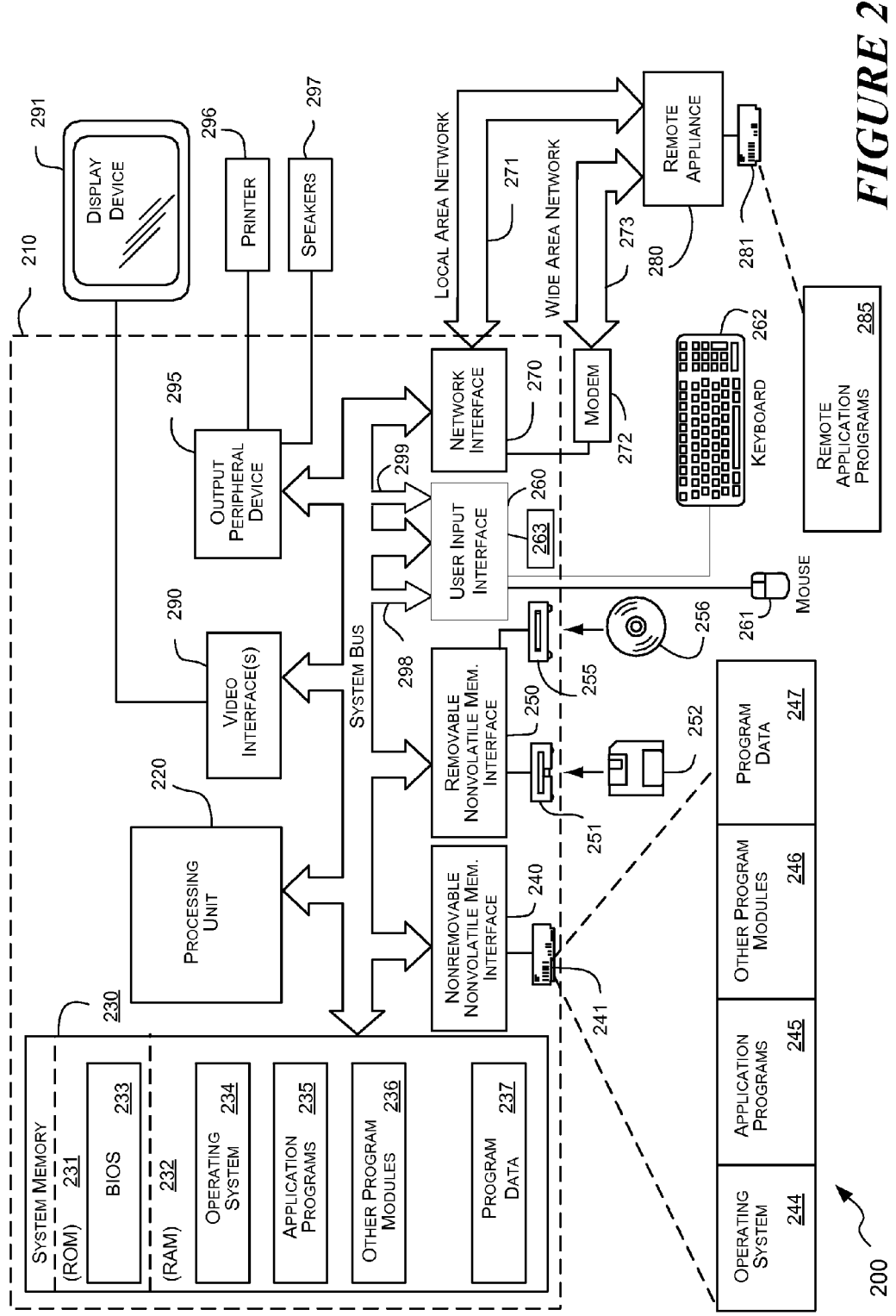
FIG. 2 illustrates an exemplary operating environment in which various embodiments can operate

FIG. 2 illustrates an exemplary operating environment 200 for implementing embodiments of reducing feedback by suppressing frequency ranges in a signal. Processes of reducing feedback by suppressing frequency ranges in a signal may be described in the general context of computer-executable instructions, such as program modules, being executed in operating environment 200. Generally, program modules include routines, programs, objects, components, data structures, etc., that perform particular tasks or implement particular abstract data types. Moreover, those skilled in the art will appreciate that processes of reducing feedback by suppressing frequency ranges in a signal may be practiced with a variety of computer-system configurations, including handheld devices, multiprocessor systems, microprocessor-based or programmable-consumer electronics, minicomputers, mainframe computers, and the like. Processes of reducing feedback by suppressing frequency ranges in a signal may also be practiced in distributed-computing environments where tasks are performed by remote-processing devices that are linked through a communications network. In a distributed-computing environment, program modules may be located in both local and remote computer-storage media including memory-storage devices.

With reference to FIG. 2, an exemplary operating environment 200 for implementing processes of reducing feedback by suppressing frequency ranges in a signal includes a computer 210 including a processing unit 220, a system memory 230, and a system bus 221 that couples various system components including the system memory 230 to the processing unit 220.

The computer 210 typically includes a variety of computer-readable media. By way of example, and not limitation, computer-readable media may comprise computer-storage media and communication media. Examples of computer-storage media include, but are not limited to, Random Access Memory (RAM); Read Only Memory (ROM); Electronically Erasable Programmable Read Only Memory (EEPROM); flash memory or other memory technology; CD ROM, digital versatile discs (DVD) or other optical or holographic disc storage; magnetic cassettes, magnetic tape, magnetic disk storage or other magnetic storage devices; or any other medium that can be used to store desired information and be accessed by computer 210. The system memory 230 includes computer-storage media in the form of volatile and/or nonvolatile memory such as ROM 231 and RAM 232. A Basic Input/Output System 233 (BIOS), containing the basic routines that help to transfer information between elements within computer 210 (such as during start-up) is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/nonremovable, volatile/nonvolatile computer-storage media. By way of example only, FIG. 2 illustrates a hard disk drive 241 that reads from or writes to nonremovable, nonvolatile magnetic media, a magnetic disk drive 251 that reads from or writes to a removable, nonvolatile magnetic disk 252, and an optical-disc drive 255 that reads from or writes to a removable, nonvolatile optical disc 256 such as a CD-ROM or other optical media. Other removable/nonremovable, volatile/nonvolatile computer-storage media that can be used in the exemplary operating environment include, but are not limited to, magnetic tape cassettes, flash memory units, digital versatile discs, digital video tape, solid state RAM, solid state ROM, and the like. The hard disk drive 241 is typically connected to the system bus 221 through a nonremovable memory interface such as interface 240.

Magnetic disk drive 251 and optical disk drive 255 are typically connected to the system bus 221 by a removable memory interface, such as interface 250.

The drives and their associated computer-storage media discussed above and illustrated in FIG. 2 provide storage of computer-readable instructions, data structures, program modules and other data for computer 210. For example, hard disk drive 241 is illustrated as storing operating system 244, application programs 245, other program modules 246, and program data 247. Note that these components can either be the same as or different from operating system 234, application programs 235, other program modules 236, and program data 237. Typically, the operating system, application programs, and the like that are stored in RAM are portions of the corresponding systems, programs, or data read from hard disk drive 241, the portions varying in size and scope depending on the functions desired. Operating system 244, application programs 245, other program modules 246, and program data 247 are given different numbers here to illustrate that, at a minimum, they can be different copies. A user may enter commands and information into the computer 210 through input devices such as a keyboard 262; pointing device 261, commonly referred to as a mouse, trackball or touch pad; a wireless-input-reception component 263; or a wireless source such as a remote control. Other input devices (not shown) may include a microphone, joystick, game pad, satellite dish, scanner, or the like. These and other input devices are often connected to the processing unit 220 through a user-input interface 260 that is coupled to the system bus 221 but may be connected by other interface and bus structures, such as a parallel port, game port, IEEE 294 port, or a universal serial bus (USB) 298, or infrared (IR) bus 299. As previously mentioned, input/output functions can be facilitated in a distributed manner via a communications network.

A display device 291 is also connected to the system bus 221 via an interface, such as a video interface 290. Display device 291 can be any device to display the output of computer 210 not limited to a monitor, an LCD screen, a TFT screen, a flat-panel display, a conventional television, or screen projector. In addition to the display device 291, computers may also include other peripheral output devices such as speakers 297 and printer 296, which may be connected through an output peripheral interface 295.

The computer 210 will operate in a networked environment using logical connections to one or more remote computers, such as a remote computer 280. The remote computer 280 may be a personal computer, and typically includes many or all of the elements described above relative to the computer 210, although only a memory storage device 281 has been illustrated in FIG. 2. The logical connections depicted in FIG. 2 include a local-area network (LAN) 271 and a wide-area network (WAN) 273 but may also include other networks, such as connections to a metropolitan-area network (MAN), intranet, or the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the network interface 270, or other appropriate mechanism. Modem 272 could be a cable modem, DSL modem, or other broadband device. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary, and other means of establishing a communications link between the computers may be used.

Although many other internal components of the computer 210 are not shown, those of ordinary skill in the art will appreciate that such components and the interconnections are well-known. For example, including various expansion cards such as television-tuner cards and network-interface cards within a computer 210 is conventional. Accordingly, additional details concerning the internal construction of the computer 210 need not be disclosed in describing exemplary embodiments of processes of reducing feedback by suppressing frequency ranges in a signal.

When the computer 210 is turned on or reset, the BIOS 233, which is stored in ROM 231, instructs the processing unit 220 to load the operating system, or necessary portion thereof, from the hard disk drive 241 into the RAM 232. Once the copied portion of the operating system, designated as operating system 244, is loaded into RAM 232, the processing unit 220 executes the operating system code and causes the visual elements associated with the user interface of the operating system 234 to be displayed on the display device 291. Typically, when an application program 245 is opened by a user, the program code and relevant data are read from the hard disk drive 241 and the necessary portions are copied into RAM 232, the copied portion represented herein by reference numeral 235.

Suppressing Signals in Frequency Ranges to Prevent Feedback

The following discussion describes exemplary ways in which the tools suppress signals in frequency ranges to prevent feedback and other inventive techniques. The tools suppress feedback by suppressing portions of the signal in which the feedback arises. Thus, users can employ a microphone and speakers for voice data communications without reducing speaker volume or repositioning a microphone or speakers in attempting to prevent the microphone from recapturing sounds rendered by the speakers.

Figure 3:
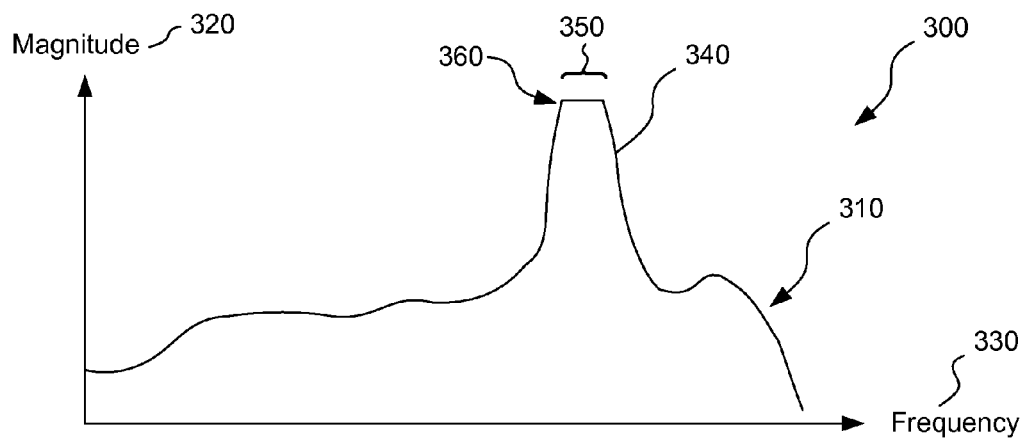
FIGS. 3 and 4 illustrate representations of signals in which feedback has resulted in a frequency range.

FIG. 3 is a spectral graph 300 representing a signal 310 at an instant in time. The graph 300 plots magnitude 320 versus frequency 330 for the signal 310. A spike 340 in the signal 310 indicates a frequency range 350 in which feedback results. In the frequency range 350, the input system captures the signal 310, the output system amplifies and renders the signal, and the input system again captures the signal 310. In other words, feedback results when a first person speaks into a microphone associated with her computer, and the first person's speech is rendered by speakers on a second computer and re-captured by a microphone associated with the second computer.

The signal 310 in the frequency range 350 looping between the output system and the input system compounds the magnitude of the signal 310, causing feedback. Practically, certain frequency ranges are amplified more than others as a result of characteristics of the audio render and capture systems, the room and the physical environment where the systems are located. Thus, physical properties of the render and capture systems and the environment in which it is used determine the frequencies under which the feedback occurs or is likely to occur. As indicated in FIG. 3, the looping of the signal 310 in the frequency range 350 between the output system and the input system may result in clipping of the signal 310 where the signal 310 has reached a maximum, saturation value 360.

Figure 4:
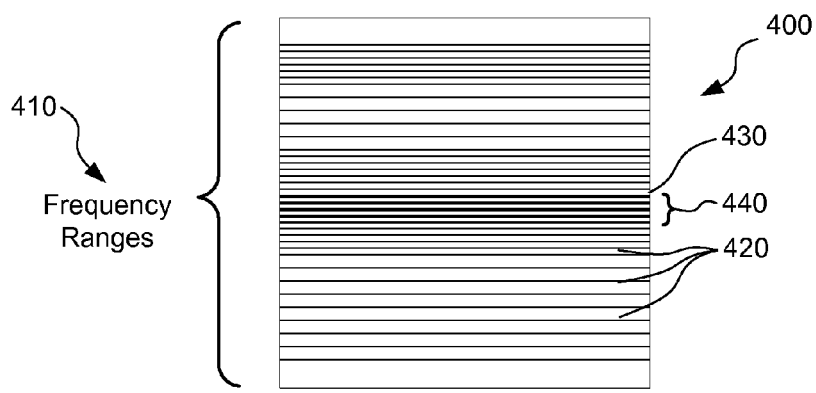

FIG. 4 represents another way of depicting a signal to identify a point where feedback is present. FIG. 4 is an intensity graph 400 representing relative intensities of spectral components 410 of a signal across a number of frequency ranges 410. Increasing intensity of the represented signal is represented with increasingly more closely placed horizontal lines 420. A highest intensity region 430, where the horizontal lines 420 are most closely spaced, indicates a high intensity range 440 where the intensity level indicates that feedback is present or likely to occur.

Using the spectral graph 300 of FIG. 3 or the intensity graph 400 of FIG. 4, frequency ranges where feedback occurs may be identified. Manual inspection of the graphs 300 and 400 or similar representations of a signal, or automatic, computer-based analysis of a signal enables identification of frequency regions where feedback occurs or is likely to occur.

Identification of frequency ranges where feedback occurs or is likely to occur may be performed a number of ways. In one mode, advance testing is used to determine frequency ranges in which feedback is likely. Using combinations of one or more sets of microphones and other input devices or systems and one or more sets of speakers or other output devices or systems, different configurations, and different output volumes, frequency ranges where feedback commonly occurs may be identified. In another mode, a computing system is configured to dynamically monitor a signal, such as an input signal captured from an input device or an output signal to be presented to an output device. One or more frequency ranges in which the signal has a high magnitude or intensity may be identified. These frequency ranges are recognized as frequency ranges where feedback is present or is likely to occur.

Figure 5:
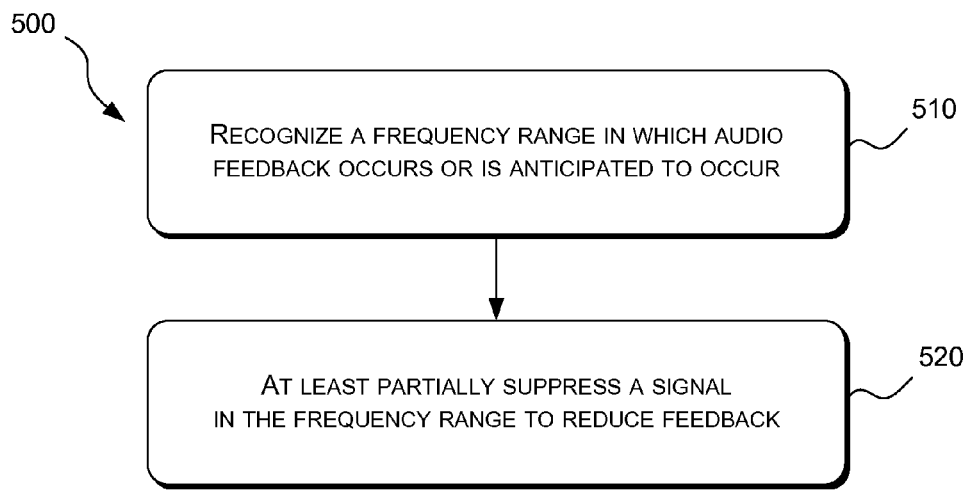
FIG. 5 illustrates an exemplary process of suppressing a frequency range of a signal to avoid feedback.

FIG. 5 is a flow diagram 500 of a mode of reducing feedback in a voice data communications application, such as a VoIP telephony application. Block 510 recognizes a frequency range in which audio feedback occurs or is anticipated. As described with reference to FIGS. 3 and 4, when a signal reaching a predetermined magnitude or intensity threshold indicates frequency ranges in which feedback occurs or is likely to occur. A computing system may automatically monitor signals to identify frequency ranges where feedback occurs or is likely to occur. Users or systems may evaluate exemplary signals to identify frequency ranges where feedback is likely to occur in typical situations. Alternatively, systems may be used to monitor signals in real time to identify frequency ranges in which feedback occurs.

Once block 510 recognizes one or more frequency ranges in which feedback occurs or is likely to occur, block 520 at least partially suppresses the signal in the identified frequency range or ranges to reduce feedback. Again, acoustic feedback results from a signal being captured, amplified, recaptured, and re-amplified. Block 520 suppresses the signal in the frequency range or ranges where feedback occurs or is likely to occur to prevent the signal from being amplified and recaptured, thereby breaking the cycle that might result in feedback. Because block 520 suppresses the signal in the frequency range or ranges in which feedback occurs or is likely to occur prevents feedback without significantly reducing the magnitude or volume of the signal across all the frequency ranges in a way that may inhibit voice data communications.

Figure 6:
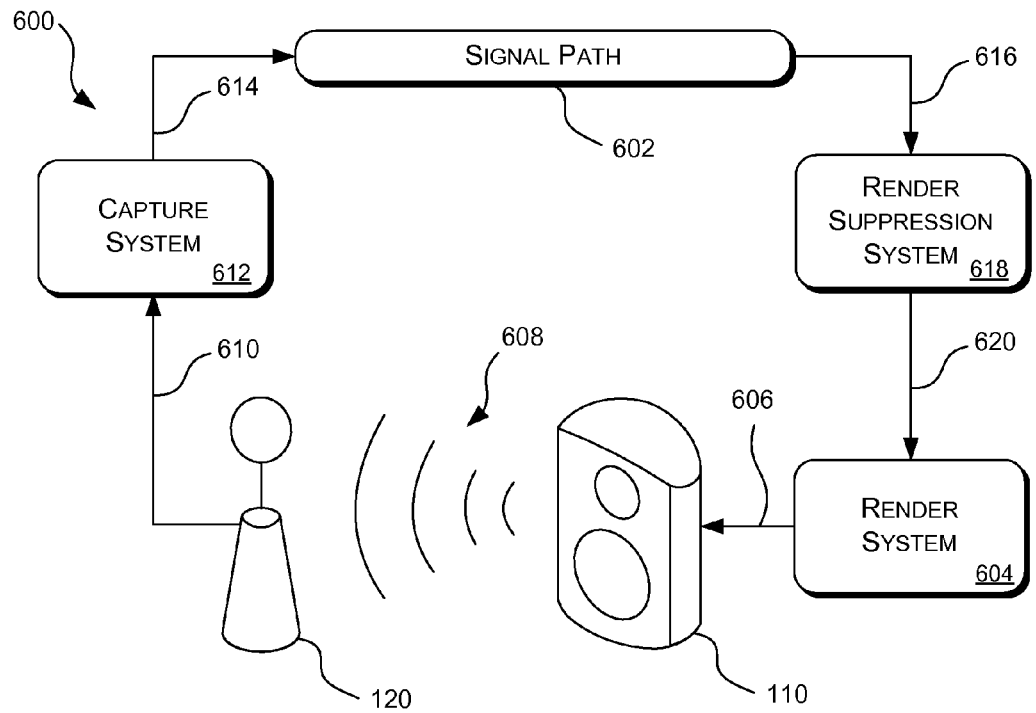
FIGS. 6 and 7 illustrate exemplary systems in which a filter is used to suppress a frequency range of a signal to avoid feedback.
Figure 7:
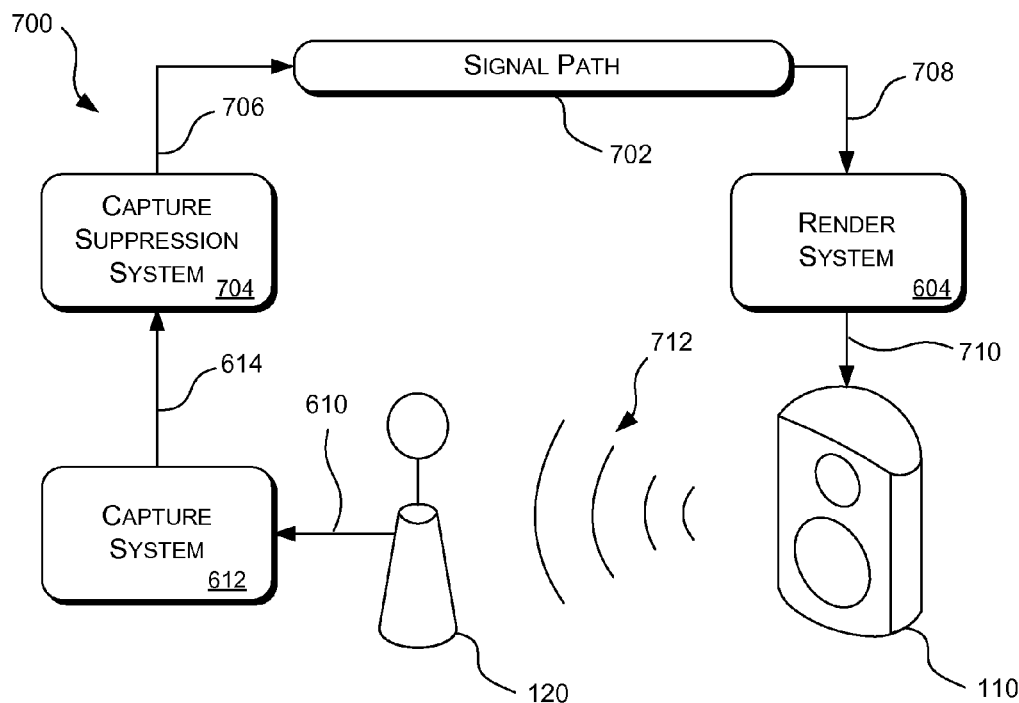

FIGS. 6 and 7 are block diagrams of two exemplary systems 600 and 700, respectively, for suppressing signals in one or more frequency ranges to reduce feedback. Each of systems 600 and 700 are suitable for VoIP applications, such that a user may use a microphone and speakers associated with his or her computer to use the computer as a full duplex speakerphone. Systems 600 and 700 show signal paths 602 and 702, respectively, that may return a signal captured in each system to be re-rendered in each system, potentially resulting in feedback. The signal paths 602 and 702 may include the user's computing system, one or more networks, and another system or a telephone on the remote end of the call.

In system 600 of FIG. 6, a render system 604 provides a render signal 606 to a speaker 110 or another output system. The speaker 110 transduces the render signal 606 and generates sounds 608. A microphone 120 or another input system captures local sounds that may include both words spoken by a local user (not shown) and the sounds 608 produced by the speaker 110 and generates a capture signal 610.

A capture system 612 processes the capture signal 610 including, for example, by digitizing the capture signal 610. The capture system 612 transmits an outbound signal 614 via the signal path 602.

The signal path 602 presents an inbound signal 616 that may include at least a portion of the outbound signal 614, potentially causing feedback. To prevent feedback, the signal path 602 passes the inbound signal 616 to a render suppression system 618. The render suppression system 618 suppresses one or more frequency ranges in the input signal 616 in which feedback occurs or is likely to occur and generates a suppressed signal 620. As described below with reference to FIG. 8, the render suppression system 618 may suppress the inbound 616 signal digitally, presenting the suppressed signal 620 to the render system 604. Alternatively, as described below with reference to FIG. 9, the render suppression system 618 may employ analog suppression, in which case the render suppression system 618 may receive the output of the render system 604 and suppress the render signal 606 before presenting it to the speaker 110.

In the embodiment of FIG. 6, the render suppression system 618 generates a suppressed signal 620 in which the render suppression system 618 suppresses the inbound signal 616 in the identified frequency range or ranges in which feedback occurs or is likely to occur.

The render system 604 thus presents a render signal 606 to the speaker 110 in which the render suppression system has suppressed the frequency range or ranges where feedback occurs or is likely to occur, breaking the feedback loop.

The system 700 of FIG. 7 is similar to system 600 of FIG. 6. Again, a render system 604 provides an output signal 606 to a speaker 110 or another output system. The speaker 110 transduces the render signal 606 and generates sounds 608. A microphone 120 or another input system captures local sounds that may include both words spoken by a local user (not shown) and the sounds 608 produced by the speaker 110 and generates a capture signal 610. The capture system 612 receives the capture signal 610 and processes it for transmission.

In the system 700, the capture system 612 provides the outbound signal 614 to a capture suppression system 612. The operation of the capture suppression system 704 is analogous to the operation of the render suppression system 618 (FIG. 6), and may use digital or analog techniques to suppress one or more frequency ranges in the outbound signal 614 in which feedback occurs or is likely to occur. The capture suppression system 704 thus generates a suppressed outbound signal 706 and transmits the suppressed outbound signal 706 via the signal path 702.

The signal path 702 presents an inbound signal 708 to the render system 604 from which the frequency range or ranges in which feedback occurs or is likely to occur have been suppressed. The capture suppression system 704 suppressed the frequency ranges in which feedback occurs or is likely to occur, thereby breaking a possible feedback cycle in signals transmitted via the signal path. The signal path 702 presents the inbound signal 708, in which potentially feedback-causing frequency range or ranges already have been suppressed, to the render system 604. The render system 604 provides a suppressed output signal 710 to the speaker 110, which the speaker transduces into sounds 712 from which the potentially feedback-causing frequency range or ranges have been suppressed.

In comparison with the system 600 of FIG. 6, where the render suppression system 618 breaks the possible feedback cycle by acting on signals received from the signal path 602, the capture suppression system 704 breaks the possible feedback cycle by suppressing one or more frequency ranges in the suppressed outbound signal before transmitting it on the signal path 702. As long as a suppression system breaks the feedback cycle at some point in the possible feedback cycle, a suppression system suppressing a signal in potentially feedback-causing frequency ranges may reduce or prevent feedback.

Figure 8:
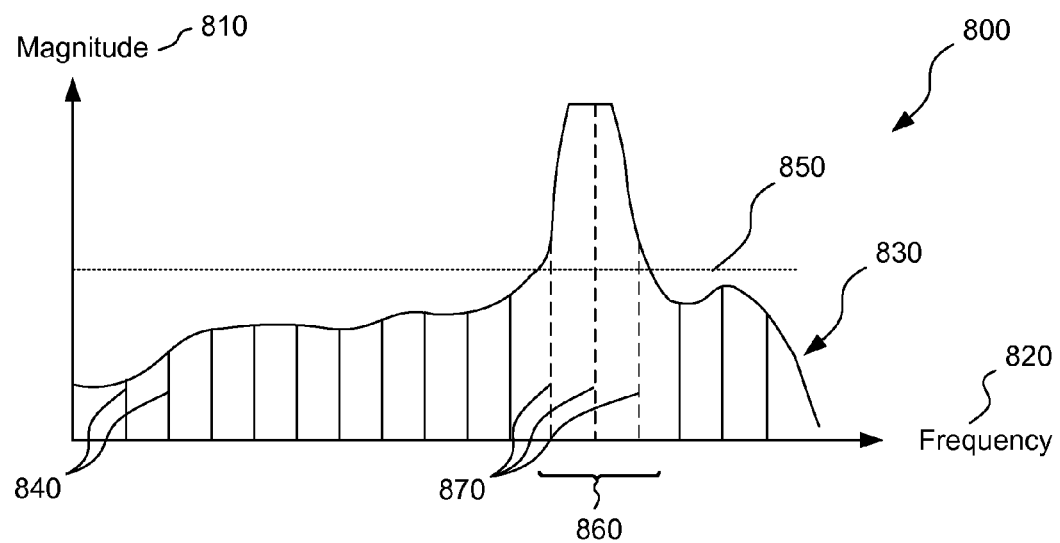
FIG. 8 illustrates a digitally sampled signal in which a sampling bit is disregarded to suppress a frequency range of a signal.
Figure 9:
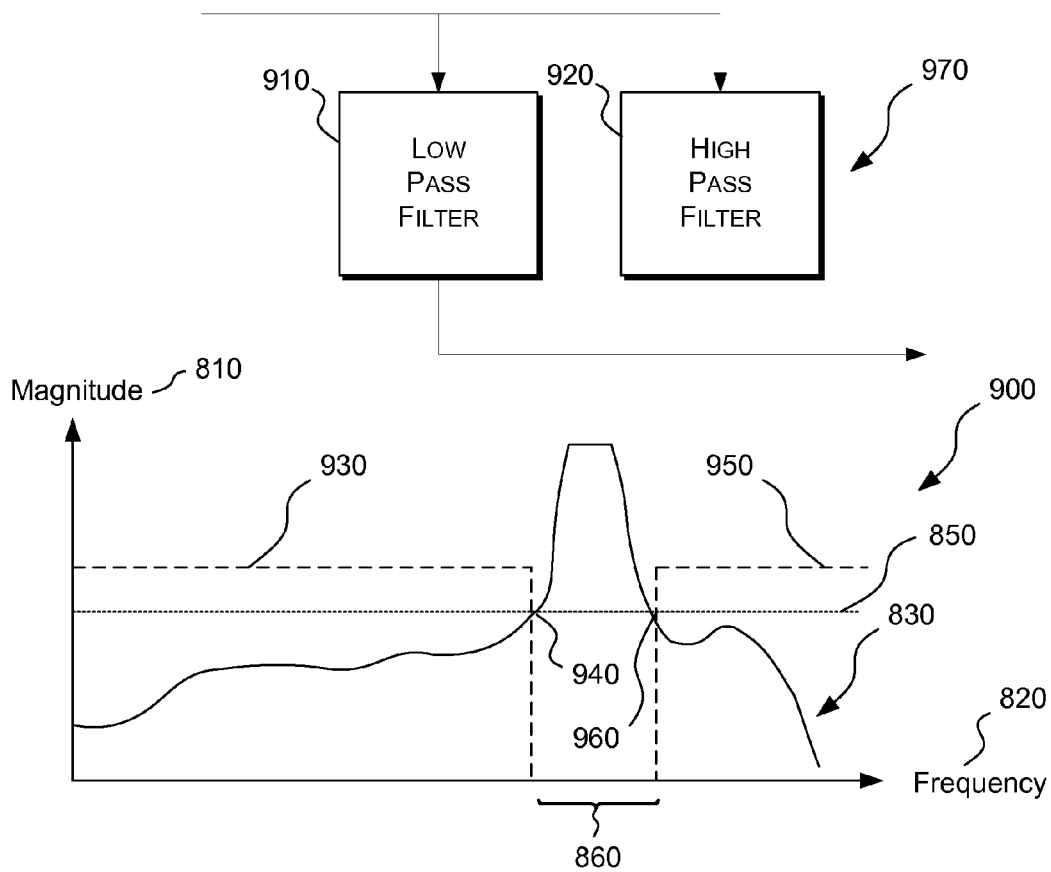
FIG. 9 illustrates an analog signal to which filters are applied to suppress a frequency range of a signal.

FIGS. 8 and 9 represent examples of digital and analog signal manipulation, respectively, that are useful in suppressing one or more frequency ranges in a signal in which feedback occurs or is likely to occur. As previously described, digital manipulation is well suited for manipulating a digital signal that a capture system 612 (FIGS. 6 and 7) produces or that a render system 604 receives. Analog manipulation is well suited for manipulating an analog signal that a microphone 120 produces or that a speaker 110 receives.

FIG. 8 is a graph 800 illustrating how a suppression system may manipulate digital sampling of a signal to reduce feedback. The graph 800 plots magnitude 810 versus frequency 820 for a signal 830. FIG. 8 also shows a plurality of frequency-based samples 840 that may be used to digitally represent the signal 830. A threshold 850 represents a predetermined magnitude beyond which the signal 830 may result in feedback. Accordingly, in a frequency range 860 where the signal 830 crosses the threshold 850, a suppression system may omit one or more digital samples 870 to remove that spectral portion of the signal 830 where feedback is anticipated. Alternatively, the suppression system may attenuate the resulting sampling within the frequency range to effectively reduce rather than eliminate the signal 830 in the frequency range 860.

A suppression system may manipulate the sampling of a signal to suppress signals in predetermined frequency ranges where training data or assumptions indicate that feedback is likely. Alternatively, the suppression system may alter the sampling dynamically to account for feedback the suppression system detects based on the characteristics of the signal.

FIG. 9 also shows a graph 900 of the signal 830 to illustrate a suppression system that may employ one or more band pass filters to suppress or attenuate the signal 830 in a frequency range 860. A band pass filter may include a combination of a low pass filter 910 and a high pass filter 920 to cutoff or attenuate the signal 830 in the frequency range 860 where feedback occurs or is likely to occur. Tuning the low pass filter 910 to have a frequency response 930 that attenuates the signal 830 at frequencies below a lower threshold point 940 where the signal 830 crosses into the frequency range 860 will suppress the signal at higher frequencies. Correspondingly, tuning the high pass filter 920 to have a frequency response 950 that attenuates the signal 830 at frequencies above an upper threshold point 960 where the signal crosses out of the frequency range 860 suppresses the signal at lower frequencies. Connecting the filters 910 and 920 in a parallel arrangement 970 will substantially pass the signal 830 in all but the selected frequency range 860. The suppression system may employ filters with fixed frequency responses 930 and 950, or the suppression system may allow manual or automatic adjustment of the frequency responses.

When anticipating that feedback will occur only in frequency ranges in which the frequency exceeds a particular frequency, a suppression system may employ a single low pass filter 910 to suppress a signal in the frequency ranges above that frequency. Alternatively, when anticipating that feedback will occur only in frequency ranges in which the frequency is below a predetermined frequency, a suppression system may employ a single high pass filter 920 to suppress the signal below that frequency. When anticipating feedback in multiple, noncontiguous frequency ranges, a suppression system may employ multiple pairs of filters to suppress the signal in each of the frequency ranges. The suppression system should couple filters in each pair in parallel as shown in FIG. 9, and couple each of the pairs in series to suppress the signal in each of the frequency ranges.

Figure 10:
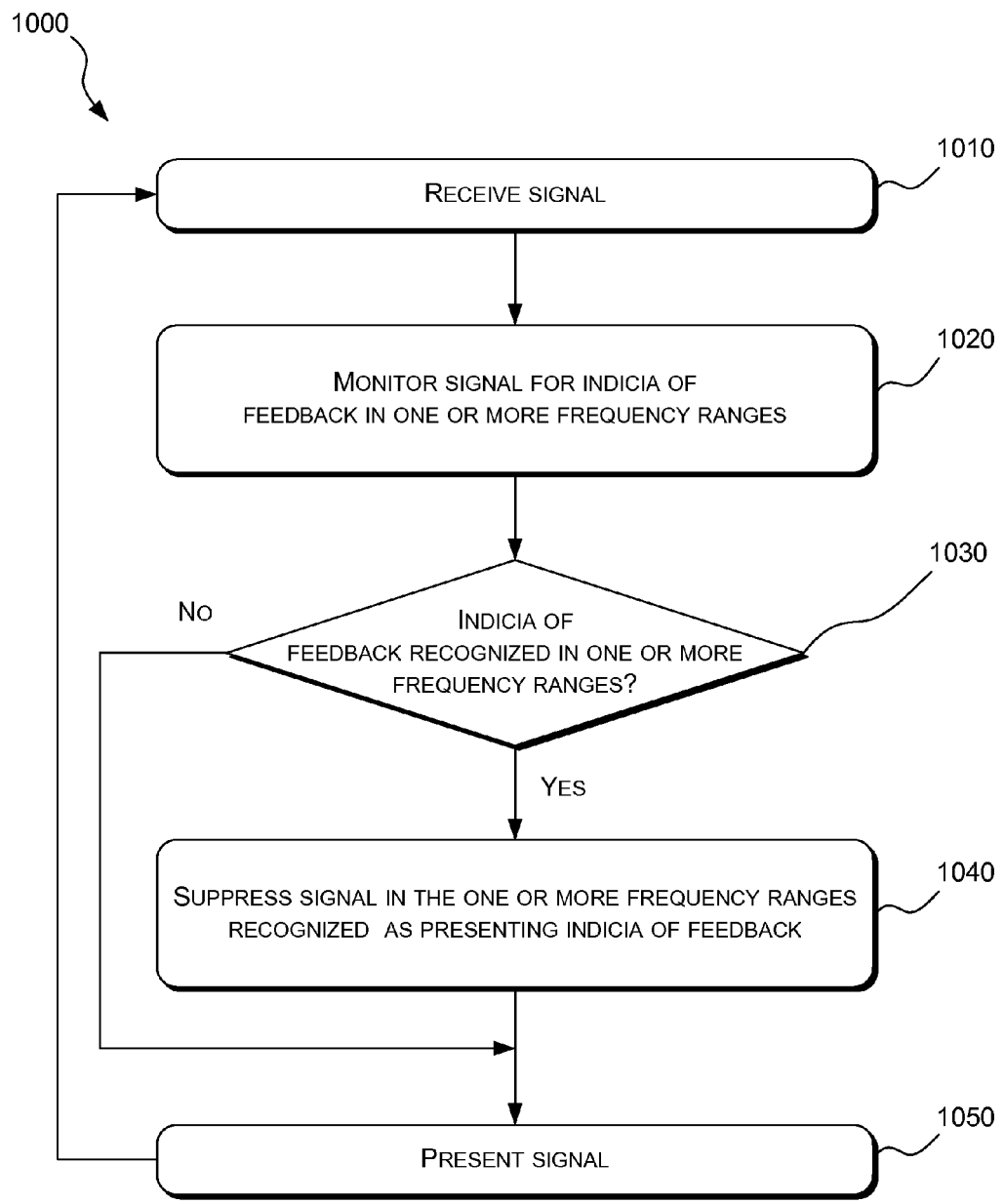
FIG. 10 illustrates an exemplary process of adaptively suppressing a frequency range of a signal to reduce feedback.

FIG. 10 is a flow diagram 1000 of a process for dynamically monitoring and suppressing one or more frequency ranges to reduce feedback. Block 1010 receives a signal in which feedback occurs or is likely to occur. The signal may be an inbound signal that a network presents as input, or the signal may be an outbound signal transmitted over a network. Block 1020 monitors the signal for indicia of feedback, such as anomalous magnitude or intensity levels as previously described with reference to FIGS. 3 and 4, or other characteristics. Block 1030 determines if any indicia of feedback are present in one or more frequency ranges. If so, block 1040 at least partially suppresses the signal in the one or more frequency ranges presenting indicia of feedback. On the other hand, if block 1030 identifies no indicia of feedback, or once block 1040 suppresses the frequency ranges in which such indicia are present, block 1050 presents the signal for render, capture, or transmission.

A suppression system may employ both a process of dynamic monitoring and suppression process with one or more fixed filters. Fixed filters could be use to suppress the signal in frequency ranges where feedback is expected, while dynamic monitoring could be employed to reduce feedback in frequency ranges where feedback is not anticipated.

CONCLUSION

The above-described systems and methods recognize and suppress frequency ranges in signals in which feedback occurs or is anticipated to occur and thereby reduce feedback. Suppressing the frequency ranges of the signals reduces feedback without having to suppress the magnitude or volume of the signals as a whole.

Although exemplary embodiments have been described in language specific to structural features and/or methodological acts, it is to be understood that the appended claims are not necessarily limited to the specific features or acts previously described. Rather, the specific features and acts are disclosed as exemplary embodiments.

The invention claimed is:

1. One or more computer-readable storage media storing instructions that, when executed on a processor, perform acts for reducing audio feedback in a voice data communications application, the acts comprising:

recognizing a frequency range in an audio signal from which the audio feedback results from an input system of a computer system re-capturing the audio signal generated by an output system of the computer system that was previously captured by the input system, the recognizing comprising:

monitoring characteristics of the audio signal;

identifying the frequency range according to the characteristics of the audio signal that indicate a presence or likelihood of feedback, the characteristics comprising a magnitude outside a predetermined range; and at least partially suppressing the audio signal in the frequency range to prevent the input system from re-capturing the audio signal output from the output device in the frequency range, wherein the audio signal is suppressed in the frequency range by:

identifying at least one data bit in a digital representation of the audio signal representing content of the audio signal within the frequency range; and disregarding the at least one data bit in the digital representation of the audio signal to suppress the content of the audio signal in the frequency range.

2. The one or more computer readable storage media of claim 1, wherein the audio signal is a capture signal generated by the input device, such that the capture signal is at least partially suppressed in the frequency range.

3. The one or more computer readable storage media of claim 1, wherein the audio signal is a render signal applied to the output device, such that the render signal is at least partially suppressed in the frequency range.

4. The one or more computer readable storage media of claim 1, the acts further comprising suppressing the audio signal in the frequency range by applying at least one suppression filter to at least partially attenuate or eliminate the content of the audio signal within the frequency range.

5. The one or more computer readable storage media of claim 1, wherein the characteristics of the audio signal include at least one of a magnitude and an intensity of the audio signal.

6. The one or more computer readable storage media of claim 1, further comprising recognizing an additional frequency range for which the characteristics of the audio signal indicate a presence or a likelihood of feedback.

7. The one or more computer readable storage media of claim 1, further comprising predetermining the frequency range based on observations indicating at which frequencies audio feedback is anticipated.

8. The one or more computer readable storage media of claim 1, wherein the voice data communications application includes a Voice over Internet Protocol (VoIP) telephony application.

9. A computer-implemented method for reducing audio feedback in a voice data communications application comprising:

recognizing a frequency range in an audio signal from which the audio feedback results from an input system of a computer system re-capturing the audio signal generated by an output system of the computer system that was previously captured by the input system, the recognizing comprising:

monitoring a magnitude and an intensity of the audio signal;

identifying a frequency range in the audio signal in which the magnitude and the intensity of the audio signal are outside a predetermined range indicating at least a likelihood of feedback; and causing sounds in the frequency range to be at least partially suppressed in the audio signal, wherein the sounds in the frequency range are suppressed in the audio signal by:
- identifying at least one data bit in a digital representation of the audio signal representing content of the audio signal within the frequency range; and
- disregarding the at least one data bit in the digital representation of the audio signal to suppress the content of the audio signal in the frequency range.

10. A method of claim 9, wherein the sounds in the frequency range are generated by the input device and the sounds are at least partially suppressed by suppressing a capture signal generated by the input device in the frequency range.

11. A method of claim 9, wherein the sounds in the frequency range are generated by the output device and the sounds are at least partially suppressed by suppressing a render signal in the frequency range.

12. A method of claim 9, wherein the sounds in the frequency range are further suppressed in the audio signal by applying a band suppression filter to at least partially attenuate or eliminate the content of the audio signal within the frequency range.

13. A method of claim 9, further comprising recognizing an additional frequency range when the capture signal is outside the predetermined range.

14. A method of claim 13, further comprising causing the sounds in a frequency range to be suppressed in the capture signal when a magnitude of the output signal in the additional frequency range is outside the predetermined range.

15. A system comprising:
memory and a processor;
audio feedback reduction functionality, stored in the memory and executable on the processor, for adaptively reducing audio feedback in a voice data communications application, comprising:
- a signal monitor for recognizing a frequency range in an audio signal from which the audio feedback results, the recognizing comprising:
  - monitoring characteristics of the audio signal in the frequency range and identifying the frequency range according to the characteristics of the audio signal that indicate a presence or a likelihood of feedback, the characteristics comprising a magnitude outside a predetermined range; and
- a filter configurable to at least partially suppress the audio signal in the frequency range in which audio feedback is anticipated as a result of an input device capturing output from an output device, wherein the audio signal is suppressed in the frequency range by:
  - identifying at least one data bit in a digital representation of the audio signal representing content of the audio signal within the frequency range; and
  - disregarding the at least one data bit in the digital representation of the audio signal to suppress the content of the audio signal in the frequency range.

16. A system of claim 15, the signal monitor further configured to identify at least one indicator signifying a likelihood of feedback to identify the frequency range in which the audio feedback is anticipated.

17. A system of claim 15, wherein the voice data communications application includes a Voice over Internet Protocol (VoIP) telephony application.

* * * * *